United States Patent [19]
Smith

[11] 3,752,086
[45] Aug. 14, 1973

[54] STOWABLE FREIGHT RESTRAINING APPARATUS

[76] Inventor: Chester A. M. Smith, R.R. No. 1, Cumberland, Ontario, Canada

[22] Filed: Jan. 26, 1972

[21] Appl. No.: 220,793

[30] Foreign Application Priority Data
Feb. 16, 1971 Canada .............................. 105,495

[52] U.S. Cl. .......... 105/369 B, 105/367, 105/369 C
[51] Int. Cl. ......................... B60p 7/12, B61d 45/00
[58] Field of Search ............ 105/366 R, 367, 368 R, 105/369 B, 369 S, 369 U, 369 C; 248/119 R; 214/10.5 R, 10.5 S

[56] References Cited
UNITED STATES PATENTS
1,833,764  11/1931  Tremblay et al. ................ 105/369 S
2,034,893  3/1936   Butterworth ..................... 105/368 R
3,200,772  8/1965   Moorhead ....................... 105/369 B Primary Examiner—Drayton E. Hoffman
Attorney—R. G. Bitner

[57] ABSTRACT

A freight restraining apparatus for a freight transporting vehicle which can be stowed within the wall of the vehicle when not in use. In the preferred embodiment a number of the restraining apparatuses are positioned within a railway freight car to restrain the movement of newsprint rolls or other cylindrically shaped lading to prevent inertial forces from causing a large number of rolls to gang up and crush those near an end wall. The restraining apparatus comprises a pair of restraining arms having freight contacting pads. Each arm of a pair is pivotally attached to a carrier member adjustably mounted in a guideway secured to the vehicle wall. The other ends of each pair of arms are connected together by means of a removeable pin.

7 Claims, 6 Drawing Figures

PATENTED AUG 14 1973

STOWABLE FREIGHT RESTRAINING APPARATUS

This invention relates to a stowable freight restraining apparatus for a freight transporting vehicle and particularly a stowable apparatus for restraining newsprint in a railway freight car.

In transporting newsprint rolls damage may result when a freight car is accelerated or decelerated, particularly upon impact with another car. Impact can occur en route, where "run-ins" and "run-outs" occur frequently, or in marshalling yards, where a car is coupled to a standing string of cars. If the rolls are not restrained in any way, inertial forces will tend to cause the rolls to gang up and collectively crush those rolls positioned near an end wall producing "starred" or "flat" rolls. The present invention provides an apparatus for restraining the movement of articles of freight in a vehicle to minimize damage, without substantially reducing the capacity or general usefullness of the freight transporting vehicle.

The invention comprises a stowable freight restraining apparatus for a freight transporting vehicle of the type having a wall structure, comprising a horizontally extending guideway associated with said wall structure for slidably receiving at least one pair of adjustable carrier members, a freight restraining arm associated with each of the carrier members, each of the arms having one end thereof pivotally connected to one of the carrier members, means for releasably connecting together a cooperating pair of arms at the other end thereof and means for locking each carrier member with respect to the wall structure when the arms are in an outwardly projecting freight restraining position.

The locking means comprises a pawl member pivotally connected to each of the carrier members and biased in a non-locking position, the guideway having a series of longitudinally spaced apertures for receiving the detent portion of the pawl member.

Each of the arms includes a cam portion at said one end thereof adapted to displace the pawl member into locking position when the arm is in an outwardly projecting freight restraining position.

Each of the pair of freight restraining arms has attached thereto, on an outer facing edge thereof, a freight contacting pad, the contacting pad conforming substantially to the configuration of the portion of the article of freight contacted thereby.

In the preferred embodiment there are a plurality of guideways associated with each of the two side walls of the freight transporting vehicle and a plurality of pairs of carrier members received by each guideway.

An embodiment of the invention will be described with reference to the drawings in which.

Figure 1:
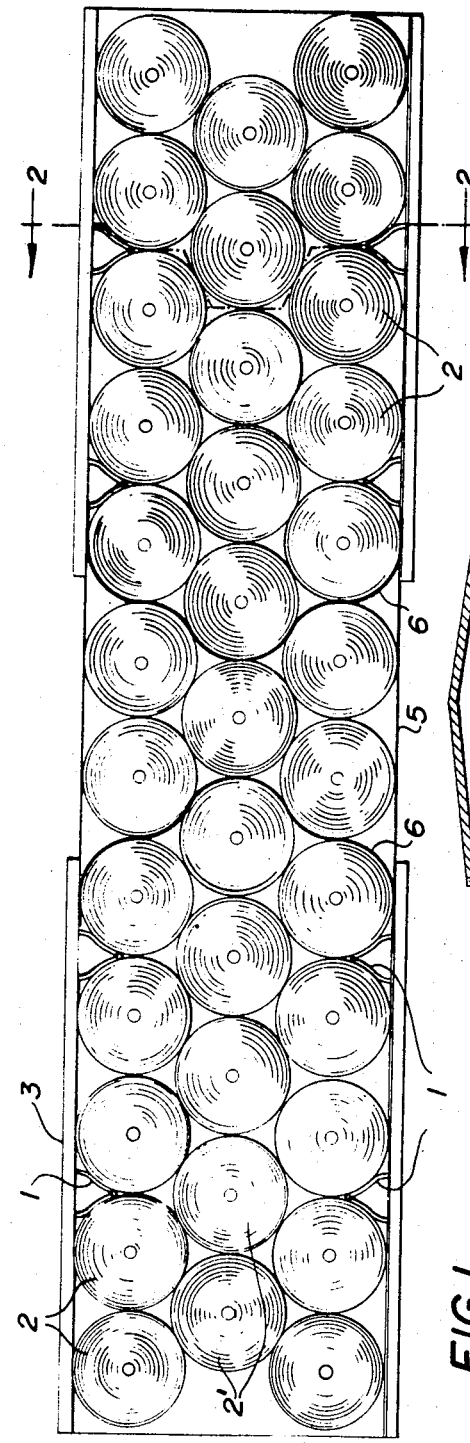
FIG. 1 is a plan view of a freight transporting vehicle with the restraining apparatuses in position for restraining rolls of newsprint.

FIG. 1 shows a plurality of freight restraining apparatuses 1 attached to the walls 3 of a freight transporting vehicle. The apparatuses 1 restrain a plurality of newsprint rolls 2.

Figure 3:
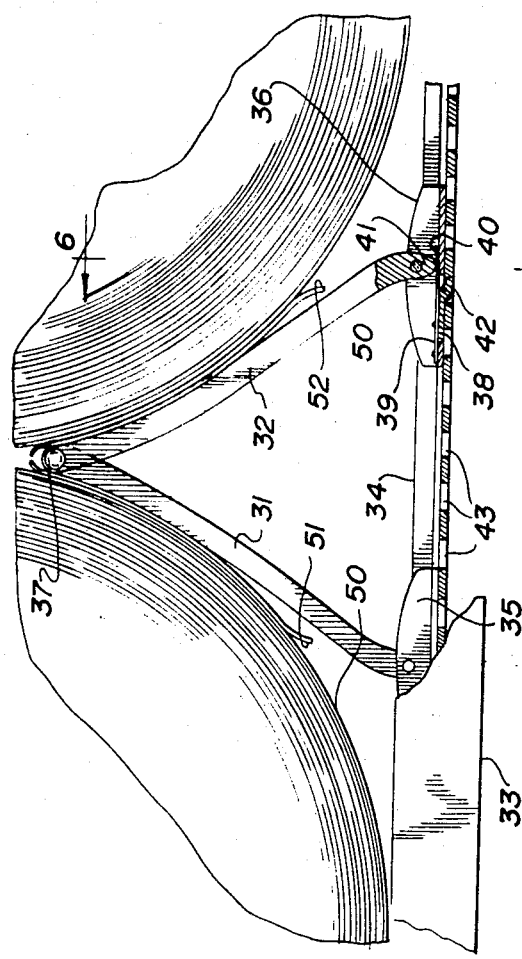
FIG. 3 is a partly sectional, partly fragmented top view of FIG. 1 showing a pair of cooperating restraining arms in a position to restrain articles of freight.
Figure 6:
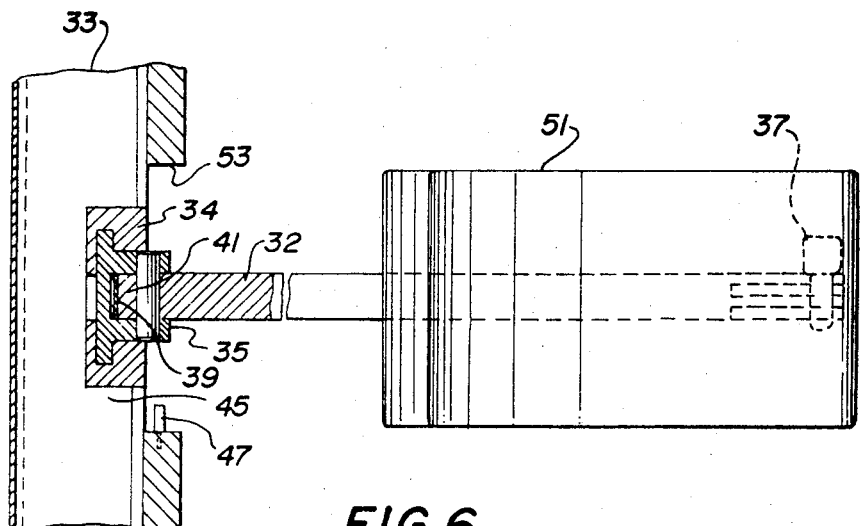
FIG. 6 is a partly sectional view taken on line 6—6 of FIG. 3.

Referring to FIGS. 3 and 6, attached to the wall structure 33 is a horizontal guideway 34. Referring specifically to FIG. 3 a pair of carrier members 35 and 36 are slidably received by the guideway 34. A pair of freight restraining arms 31 and 32 have one end thereof pivotally connected to the carrier members 35 and 36, respectively. The other ends of the restraining arms 31 and 32 are releasably connected together by means of a removable pin 37.

The adjustable carrier members 35 and 36 are adapted to be locked with respect to the wall structure 33 when the restraining arms 31 and 32 are in an outwardly projecting freight restraining position, as in FIG. 3. The locking means of each adjustable carrier member is in the form of a pawl member 38 that is pivotally connected to the carrier member 36 by means of an interconnecting spring element 39. An extension of the spring element 39 is adapted to be contacted by a cam portion 41 of the restraining arm 32 such that in the restraining position the detent portion 42 of the pawl member 38 enters one of a plurality of longitudinally spaced apertures 43 in the guideway 34.

Attached to each restraining arm 31 and 32 is a freight contacting pad 51 and 52, respectively, preferably conforming with the shape of the articles of freight in order to increase the area of contact so as to minimize damage to the articles upon impact to the freight transporting vehicle.

Figure 4:
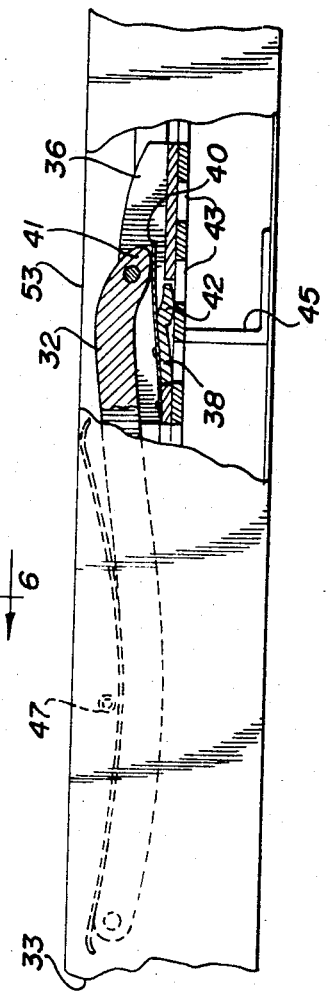
FIG. 4 is a partly sectional, partly fragmented top view of one restraining arm of FIG. 1 in a stowed position.

FIG. 4 illustrates one restraining arm in the stowed position within the wall of the vehicle. The detent portion 42 of the pawl member 38 is free of the apertures 43 and therefore the carrier member 36 and the restraining arm 32 is free to be adjusted longitudinally along the guideway. A pin 47 may be used to ensure that the arm 32 remains positioned within the wall when not in use, and also to limit the longitudinal movement of the unlocked carrier member 36.

Figure 5:
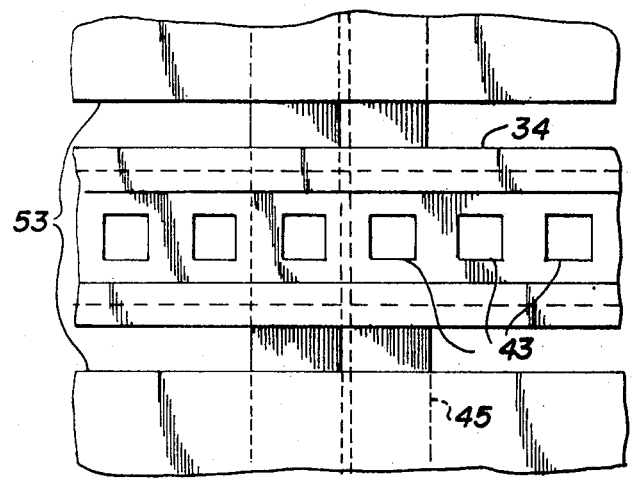
FIG. 5 is a fragmented elevation of the inside wall of a freight transporting vehicle showing the guideway for the restraining apparatus shown in FIG. 1.

Details of the guideway 34 can be best seen in FIGS. 5 and 6. The guideway comprises a C-shaped channel member adapted to receive the T-shaped carrier member. Typically the wall structure of a railway freight car comprises a plurality of Z-sectioned standards 45. These standards are partially cut out to receive the guideway 34. The guideway may be secured to the Z-section by any suitable means such as by welding.

A longitudinally extending recess in the inner wall panel 53, which is contiguous with the guideway 34, is designed to receive the restraining arm with contacting pad in the stowed position.

In operation, when the restraining arm 32 is in a stowed position as in FIG. 4 or is not extended sufficiently for the cam portion 41 to depress the pawl member 38, the carrier member 36 is free to be adjusted since the pawl member 38 is biased outwardly from the apertures 43. Each of the carrier members can be positioned as required for a particular article of freight. The spacing of a cooperating pair of carrier members will be determined by the desired loading pattern which in turn will be determined by the size of the articles of freight.

When the carrier members are in the desired location, each one of a pair of restraining arms, 31 and 32 of FIG. 3 are swung outwardly away from the wall whereby the cam portion 41 depresses the spring element 40 to bias the detent portion 42 into locking engagement with one of the apertures 43 of the guideway 34. Interconnecting the other ends of the restraining arms 31 and 32 by pin 37 locks the carrier members 35 and 36 with respect to the guideway 34 and wall structure 33 to define a rigid restraining apparatus.

Figure 2:
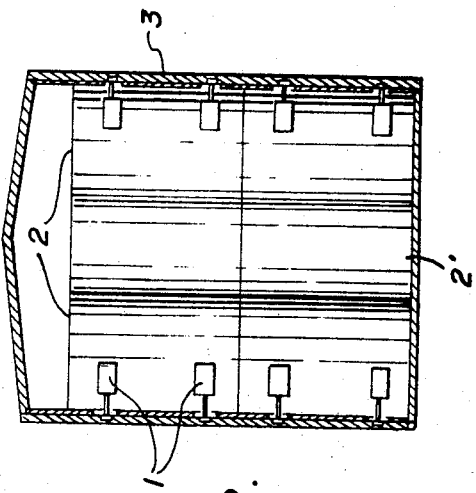
FIG. 2 is a sectional view taken on line 2—2 of FIG. 1.

A typical modern freight car is illustrated in FIGS. 1 and 2. In the preferred arrangement there are 4 guideways in each side wall of the vehicle with a total of 32 restraining apparatuses 1, restraining 2 tiers, each of 35 rolls, of 40 inch diameter newsprint rolls. Preferably each restraining apparatus projects transversely inwardly approximately 18 inches from the wall of the vehicle. The contacting pads are of sheet metal 11 inches long and 6 inches wide and have a radius of curvature corresponding with that of the rolls. The rolls 2' of the center row are restrained by their interlocking quincuncial relationship with the rolls 2 on both sides thereof.

With reference to FIG. 1 it will be seen that there are no restraining apparatuses shown in the doorway 5. Other restraining means may be employed to restrain freight articles in this region. Satisfactory means for restraining a number of the articles in this central region are belts attached to the wall 3. Suitable belts were found to be 6 inches wide, one near the top and one near the bottom of each tier of newsprint rolls. In the preferred embodiment it is not necessary to provide a restraining apparatus for each article. It is necessary only that there be sufficient restraining means to prevent a large number of unrestrained articles from ganging up and with their combined inertial forces crushing those near the end of the car.

Although the above description is directed primarily to the transport of rolls of newsprint in railway freight cars, it will be understood that the invention is not to be limited thereto and that the invention may be used for the protection of various types of articles in various types of vehicles that are subjected to shock.

What is claimed is:

1. A stowable freight restraining apparatus for a freight transporting vehicle of the type having a wall structure, comprising a horizontally extending guideway associated with said wall structure for slidably receiving at least one pair of adjustable carrier members, a freight restraining arm associated with each of said carrier members, each of said arms having one end thereof pivot-ally connected to one of said carrier members, means for releasably connecting together a cooperating pair of said arms at the other end thereof and locking means for automatically locking each carrier member with respect to said wall structure when said arms are pivoted to an outwardly projecting freight restraining position.

2. The apparatus of claim 1 wherein said locking means comprises a pawl member pivotally connected to each of said carrier members and biased in a nonlocking position, said guideway having a series of longitudinally spaced apertures for receiving the detent portion of said pawl member in a locking position.

3. The apparatus of claim 2 wherein each of said arms includes a cam portion at said one end thereof adapted to displace said pawl member into locking position when said arm is in an outwardly projecting freight restraining position.

4. The apparatus of claim 1 wherein each of said pair of freight restraining arms has attached thereto, on an outer facing edge thereof, a freight contacting pad, said contacting pad conforming substantially to the configuration of the portion of the article of freight contacted thereby.

5. The apparatus of claim 4 having a plurality of guideways associated with each of the two side walls of said freight transporting vehicle, and a plurality of pairs of carrier members slidably received by each of said guideways, tp provide a plurality of longitudinally spaced freight restraining apparatuses within said vehicle.

6. The apparatus of claim 6 wherein said vehicle is adapted to receive three longitudinally extending rows of articles consisting of two outer rows and one central row, wherein articles of said two outer rows are restrained by said plurality of longitudinally spaced freight restraining apparatuses, and the articles of said central row are restrained by the interlocking quincuncial relationship with the articles of said outer rows.

7. The apparatus of claim 5 wherein said articles of freight are rolls of newsprint.

* * * * *